US012771196B2

(12) United States Patent
Gerber et al.

(10) Patent No.: US 12,771,196 B2
(45) Date of Patent: Oct. 20, 2026

(54) THREE-PHASE DUAL ELECTRIC MACHINE AND METHOD FOR CONTROLLING SUCH A MACHINE

(71) Applicant: Moving Magnet Technologies, Besançon (FR)

(72) Inventors: Mathieu Gerber, Besançon (FR); Damien Laforge, Chemaudin et Vaux (FR); Guillaume Callerant, Chavannes-sur-1'Etang (FR)

(73) Assignee: Moving Magnet Technologies, Besançon (FR)

( * ) Notice: Subject to any disclaimer, the term of this patent is extended or adjusted under 35 U.S.C. 154(b) by 796 days.

(21) Appl. No.: 17/757,626

(22) PCT Filed: Dec. 18, 2020

(86) PCT No.: PCT/FR2020/052542

§ 371 (c)(1),
(2) Date: Jun. 17, 2022

(87) PCT Pub. No.: WO2021/123673

PCT Pub. Date: Jun. 24, 2021

(65) Prior Publication Data

US 2023/0024531 A1 Jan. 26, 2023

(30) Foreign Application Priority Data

Dec. 19, 2019 (FR) ...................................... 1915009

(51) Int. Cl.
*H02K 3/28* (2006.01)
*H02K 3/12* (2006.01)
(Continued)

(52) U.S. Cl.
CPC ................. *H02K 3/28* (2013.01); *H02K 3/12* (2013.01); *H02P 25/184* (2013.01); *H02P 27/08* (2013.01);
(Continued)

(58) Field of Classification Search
CPC ........ H02K 3/28; H02K 3/12; H02K 2213/03; H02P 25/184; H02P 27/08; H02P 2207/07
See application file for complete search history.

(56) References Cited

U.S. PATENT DOCUMENTS

2005/0012479 A1 1/2005 Wolf et al.
2006/0284510 A1 12/2006 Tauvron et al.
(Continued)

FOREIGN PATENT DOCUMENTS

CA 2138838 * 11/2004 .............. H02P 6/187
CN 106712428 A 5/2017
(Continued)

OTHER PUBLICATIONS

International Search Report for International Application No. PCT/FR2020/052542 dated Feb. 18, 2021, 4 pages.
(Continued)

*Primary Examiner* — Terrance L Kenerly
(74) *Attorney, Agent, or Firm* — TraskBritt

(57) ABSTRACT

An electric machine comprising a first and a second three-phase winding and comprising a stator formed of a cylindrical yoke made of a soft ferromagnetic material extended radially by a set of teeth, a portion of the set of teeth bearing the windings, the windings being distinct from one another, the first three-phase winding being connected in a delta configuration, the second three-phase winding being connected in a star configuration.

17 Claims, 11 Drawing Sheets

(51) Int. Cl.
*H02P 25/18* (2006.01)
*H02P 27/08* (2006.01)

(52) U.S. Cl.
CPC ...... *H02K 2213/03* (2013.01); *H02P 2207/07* (2013.01)

(56) References Cited

U.S. PATENT DOCUMENTS

| | | | | |
|---|---|---|---|---|
| 2010/0054971 | A1* | 3/2010 | Li | H02K 21/14 310/195 |
| 2014/0208745 | A1* | 7/2014 | Suhocki | F02B 33/40 60/273 |
| 2014/0375232 | A1 | 12/2014 | Findeisen et al. | |
| 2017/0264178 | A1* | 9/2017 | Stauder | H02K 11/33 |

FOREIGN PATENT DOCUMENTS

| | | | |
|---|---|---|---|
| EP | 1225676 | B1 | 4/2012 |
| EP | 3224929 | B1 | 4/2019 |
| EP | 3464841 | | 4/2019 |
| EP | 2991206 | B1 | 4/2020 |
| EP | 3098963 | B1 | 9/2021 |
| JP | 2007-504794 | A | 3/2007 |
| JP | 2015-149893 | A | 8/2015 |
| JP | 2015-524650 | A | 8/2015 |
| JP | 2014-007823 | A | 3/2025 |
| WO | 2016/012703 | A1 | 4/2016 |
| WO | 2017/202971 | | 8/2018 |

OTHER PUBLICATIONS

International Written Opinion for International Application No. PCT/FR2020/052542 dated Feb. 18, 2021, 6 pages.

Japanese Notice of Reasons for Refusal for Application No. 2022-537051 dated Oct. 29, 2024, 8 pages with English translation.

* cited by examiner $$T_n = \gamma \cdot n \cdot 2 \cdot \frac{V_{DC} \cdot D}{R\varphi_{eq} + L\varphi_{eq}}$$

$$\Delta T_n = \gamma \cdot n \cdot 2 \cdot \frac{V_{DC} \cdot \Delta D}{R\varphi_{eq} + L\varphi_{eq}}$$

$$T_m = \gamma \cdot n \cdot \frac{V_{DC} \cdot D}{R\varphi_{eq} + L\varphi_{eq}}$$

$$\Delta T_m = \gamma \cdot n \cdot \frac{V_{DC} \cdot \Delta D}{R\varphi_{eq} + L\varphi_{eq}}$$

THREE-PHASE DUAL ELECTRIC MACHINE AND METHOD FOR CONTROLLING SUCH A MACHINE

CROSS-REFERENCE TO RELATED APPLICATIONS

This application is a national phase entry under 35 U.S.C. § 371 of International Patent Application PCT/FR2020/052542, filed Dec. 18, 2020, designating the United States of America and published as International Patent Publication WO 2021/123673 A1 on Jun. 24, 2021, which claims the benefit under Article 8 of the Patent Cooperation Treaty to French Patent Application Serial No. FR1915009, filed Dec. 19, 2019.

TECHNICAL FIELD

The present disclosure relates to the field of polyphase electric machines as well as the control thereof, and relates more particularly to machines having several three-phase wound systems that must work at relatively high ambient temperatures, typically 160° C.

BACKGROUND

Preferably but non-limitingly, the present disclosure will find a privileged use in demanding automotive applications, such as, for example, in an electric camshaft phase shifter or even in a wastegate actuator for a turbocharger, applications that are close to a source of significant caloric emissions and that require considerable compactness for integration into the environment.

The following documents are already known in the state of the art, presenting polyphase electrical architectures with two three-phase systems:

Document EP3098963, for example, presents a three-phase dual architecture minimizing the common mode of the machine when driven in vector control. Vector control allows good machine performance to be obtained in terms of torque regularity, but has the disadvantage of requiring complex control with advanced control electronics as well as a precise position sensor.

Document US2014375232 also presents a three-phase dual architecture having two separate power sources with an energy transfer circuit between the two three-phase systems. Here again, the control of the machine is a vector control with, moreover, the need to double the power sources.

Document WO2016012703 also presents a three-phase dual architecture having two distinct control modules, intended for the automobile, the two modules being interconnected to minimize the total losses of these modules. The type of control is not specified and requires constant phase angle control for the two electronic modules. It is also well known to produce a 30° offset between two three-phase systems in order to obtain the equivalent of a balanced six-phase architecture.

Finally, document EP3224929 presents a three-phase dual architecture with the use of a star connection and a delta connection, the two three-phase networks being associated with two voltage sources of different value.

In the context of automotive applications working at medium power (typically a few tens of watts to a few kilowatts), the architectures of the state of the art cannot be applied efficiently and economically. Indeed, using a complex vector control or two separate electronic modules makes the solution too bulky and expensive compared with the three-phase solutions with which they are in competition, the latter being the most widely represented at present for these applications.

Moreover, the existing three-phase dual systems most often use electric machines having several windings per phase, with the interweaving of the different phases of the two three-phase systems making the production uneconomical and industrially complex typically with the presence of 12 or more windings to be managed.

In the state of the art, there are no simple and economical solutions that allow a compact actuator to be obtained for medium-power automotive applications with the advantages of three-phase dual systems compared to a simple three-phase system: greater and more constant average torque, harmonic content of signals and more favorable torque.

BRIEF SUMMARY

Aims of the Present Disclosure

It is the main object of the present disclosure to provide simple and economically viable three-phase dual electric machines for the automotive industry in medium-power applications.

In particular, one of the aims of the present disclosure is to propose a generic topology of a three-phase dual machine that is optimized for block control, owing to the use of decoupling teeth magnetically separating the phases of each half-machine and the phases between the two half-machines. The proposed topology is thus adapted to the simplicity of block control compared to the vector controls of the state of the art.

One of the other objects of the present disclosure is to significantly limit or simplify the number of motor windings and to allow improved compactness compared to equivalent three-phase solutions.

It is also within the object of the present disclosure to propose a simple control for such machines, in particular, in the context of the use of block switching, which is much simpler to implement than a vector control, supported by economical electronic equipment, while retaining the aforementioned advantages.

More particularly, the present disclosure relates to an electric machine having a first and a second three-phase winding and comprising a stator formed of a cylindrical yoke made of a soft ferromagnetic material extended radially by a set of teeth, a portion of the set of teeth bearing the windings, the windings being distinct from one another, the first three-phase winding being electrically connected in a delta configuration, the second three-phase winding being electrically connected in a star configuration, characterized in that the total number of the stator teeth is equal to 3.(N1+N2).(k+1) with k a natural integer greater than or equal to 1 representing the number of consecutive coils of the same phase of a winding, N1 and N2 being the number of groups of consecutive coils of the same phase of the first and second windings, respectively, the two windings being separated by at least one tooth bearing no winding.

Within the meaning of the present disclosure, "number of consecutive coils of the same phase" means the number of coils belonging to the same phase and to the same half-machine and which are adjacent and not separated by an unwound tooth.

Similarly, within the meaning of the present disclosure, "number of groups of consecutive coils of the same phase" means the number of groups consisting of consecutive coils belonging to the same phase of the same half-machine separated by at least one decoupling tooth. These groups of coils can be separated by a single decoupling tooth or by several teeth and other groups of coils belonging to other phases.

Preferably, the windings are borne by main teeth, the teeth bearing no windings, since they are decoupling teeth and the angular width of the decoupling tooth, considered from the center of the machine and delimited by the width of the free end of the teeth, is less than or equal to the angular width of the main teeth. In this way, the flux collected by the wound teeth is maximized.

A preferred machine will be according to the relationship N1=N2=k=1, with twelve teeth in total including six wound teeth and six non-wound teeth alternately, making a machine economical to produce.

In one possible embodiment, the first three-phase winding is borne by a first group of consecutive stator teeth alternating between a wound tooth and an unwound tooth and the second three-phase winding is borne by a second group of consecutive stator teeth alternating between a wound tooth and an unwound tooth, the first and second groups of stator teeth being separate from each other.

In another embodiment, the first three-phase winding and the second three-phase winding are alternated so that a periodic pattern is formed of a first tooth of the stator bearing a coil of the first winding, a second tooth of the stator bearing no winding, and a third tooth of the stator bearing a coil of the second winding, the first, second and third teeth being consecutive in the circumferential direction of the stator.

Preferably, the first winding is angularly distributed over a first sector of 180°, the second winding is angularly distributed over a second sector of 180°, the first and second sectors being separate from each other, and each of the windings is electrically connected to a set of electric tracks, the sets of electric tracks being separate from each other and angularly distributed over two angular sectors of 180° that are separate from each other.

The present disclosure also relates to a method for controlling a machine having a three-phase dual winding as described above, characterized in that each three-phase winding is controlled by a block sequence and in that each three-phase winding is controlled with an offset of 30° electric relative to each other, so as to produce twelve evenly electrically distributed control vectors.

Preferably, the first and second windings are powered by two different power bridges each comprising six electronic switch cells.

Advantageously and preferentially, the block control is carried out using pulse width modulation, called PWM; a first PWM is applied to the first winding, a second PWM is applied to the second winding and the first and second PWMs are applied so as to cancel or minimize the overlap periods during which the positive alternations are applied at the same time.

In one embodiment, the PWMs are applied to the electronic switches and in a variant embodiment, the machine further comprises, upstream of the power bridges with six electronic switch cells, a rectifier bridge formed by four electronic switch cells receiving as input a two-wire electrical signal coming from a central control unit, the block control is carried out using a pulse width modulation, called PWM, the PWM control is applied as input of the bridge rectifier, the bridge rectifier carrying out the active rectification of the PWM control and the two power bridges being controlled with full pitch.

The control of the two three-phase windings can be performed by one and the same microprocessor or else by two separate microprocessors.

The present disclosure also relates to an adjusting device for the continuous phase shift of the angle of rotation of a camshaft controlling the gas exchange valves of an internal combustion engine with respect to a drive element, in particular, a chain or belt, comprising a brushless adjustment electric motor with a stator that is stationary relative to an outer ring gear, the motor being coupled to a reduction gear with three inputs/outputs comprising the outer ring gear, an input element and an output disc, the outer ring gear being driven by the drive element, the output disc being secured to the camshaft, characterized in that the motor is an electric machine according to the aforementioned variants.

The present disclosure also relates to a system comprising an electromagnetic actuator intended to control a wastegate for a turbocharger and a wastegate, characterized in that the motor is an electric machine according to the aforementioned variants.

BRIEF DESCRIPTION OF THE FIGURES

Other features and advantages of the present disclosure will become clear upon reading the following detailed embodiments, with reference to the accompanying figures, in which.

DETAILED DESCRIPTION

Figure 1:
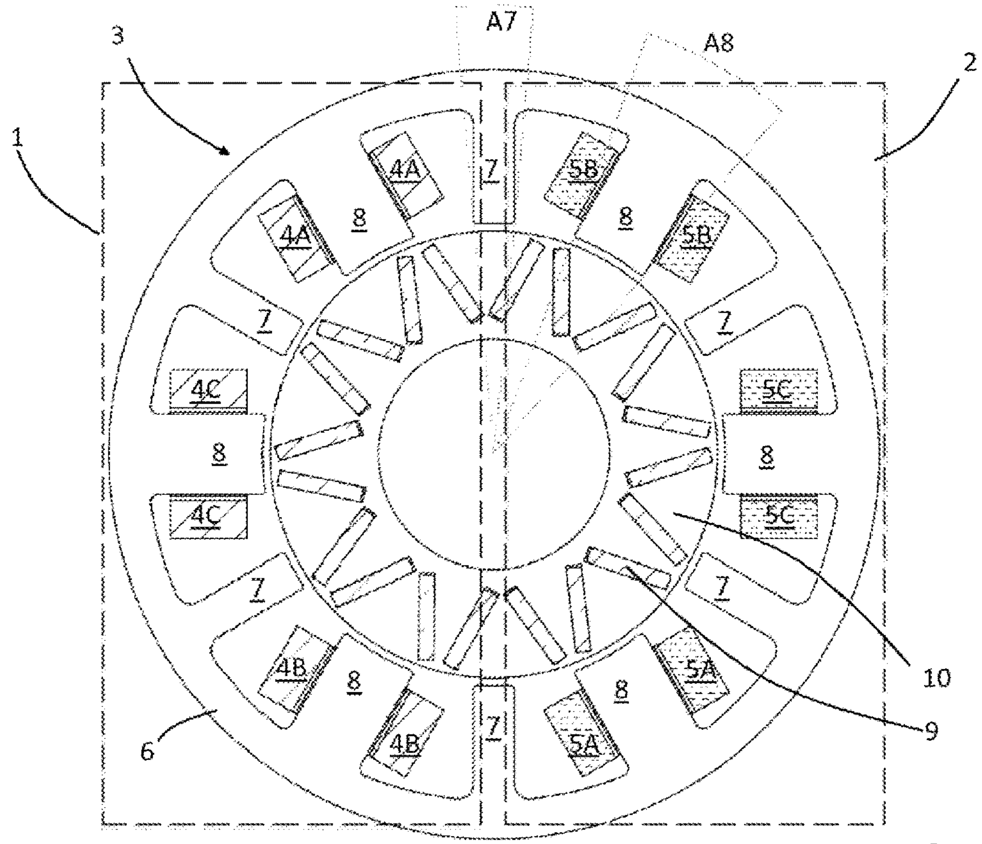
FIG. 1 is a schematic cross-sectional view of a machine according to the present disclosure in a first embodiment.

FIG. 1 shows a first example of an electric machine according to the present disclosure, comprising a stator (3) composed of two half-machines, respectively (1) and (2), each carrying a three-phase winding, respectively (4*a*, 4*b*, 4*c*) and (5*a*, 5*b*, 5*c*), each of the indices a, b and c representing a phase of the three-phase systems formed. The stator (3) is in the form of a cylindrical ring (6) from which teeth extend radially. Each half-machine (1, 2) has two types of teeth alternating with each other: the tooth (8) bearing a coil is called the main tooth and the tooth (7) bearing no winding is called the decoupling tooth and has the role of magnetically decoupling the phases and the two half-machines. The half-machine (1) composed of all the main teeth (8) and the secondary teeth (7) thus creates 3 elementary patterns, positioned successively in the tangential direction. The half-machine (2) composed of all the main teeth (8) and the secondary teeth (7) thus creates 3 elementary patterns, positioned successively in the tangential direction. In the example case of this FIG. 1, the different phases of a first half-machine (1) are connected in a delta configuration and the different phases of the second half-machine (2) are connected in a star configuration. The decoupling teeth have an opening angle (a7), the vertex of this angle being the center of rotation of the motor and the angle being defined by the width of the tooth at its open end, which is less than or equal to the opening angle of the main teeth (a8) in order to maximize the magnetic flux harvested by the main tooth (8) and thus to improve the performance of the machine, although this relationship is not strictly necessary within the scope of the present disclosure.

In this FIG. 1, the rotor is composed of magnets (9) internal to a rotor yoke (10) made of ferromagnetic material and an axis (not visible) that may or may not be ferromagnetic. This rotor is shown as an example only and any other type of rotor, traditionally used in any brushless machine, can be used.

Figure 2:
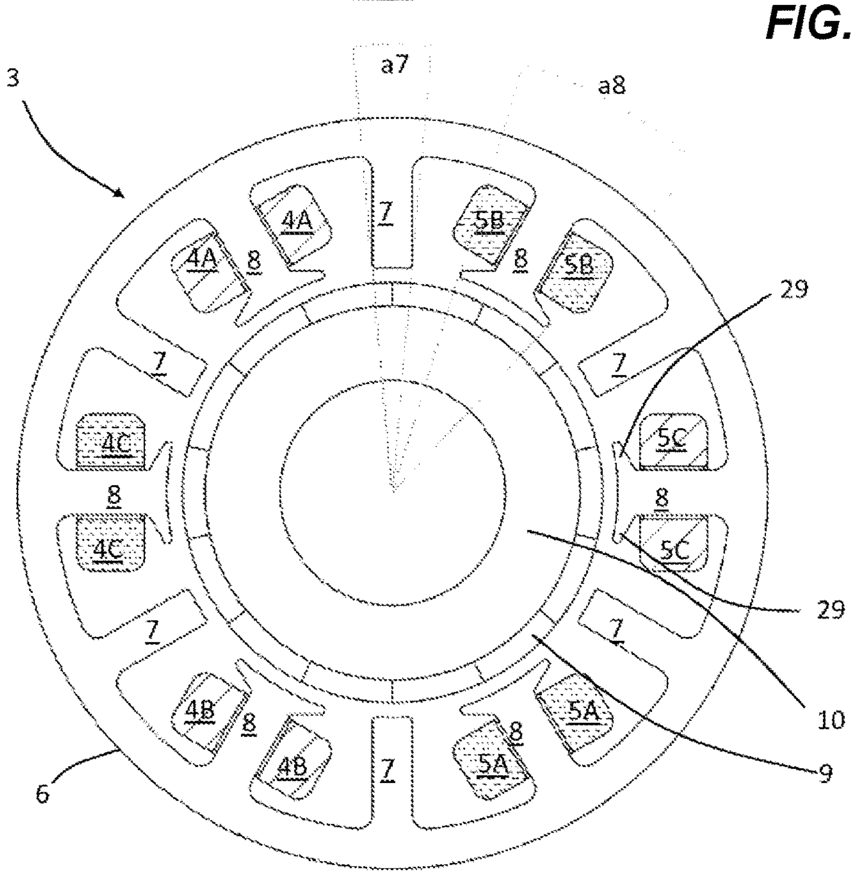
FIG. 2 is a schematic cross-sectional view of a machine according to the present disclosure in a second embodiment.

FIG. 2 shows a variant embodiment similar to that shown in FIG. 1, but differs from the latter in that the main teeth (8) have, at their open end, flares (29), or pole shoes, in order to harvest more magnetic flux generated by the rotor and in that the rotor has magnets (9) on the surface of the yoke (10), this rotor being a second embodiment of a rotor.

Figure 3:
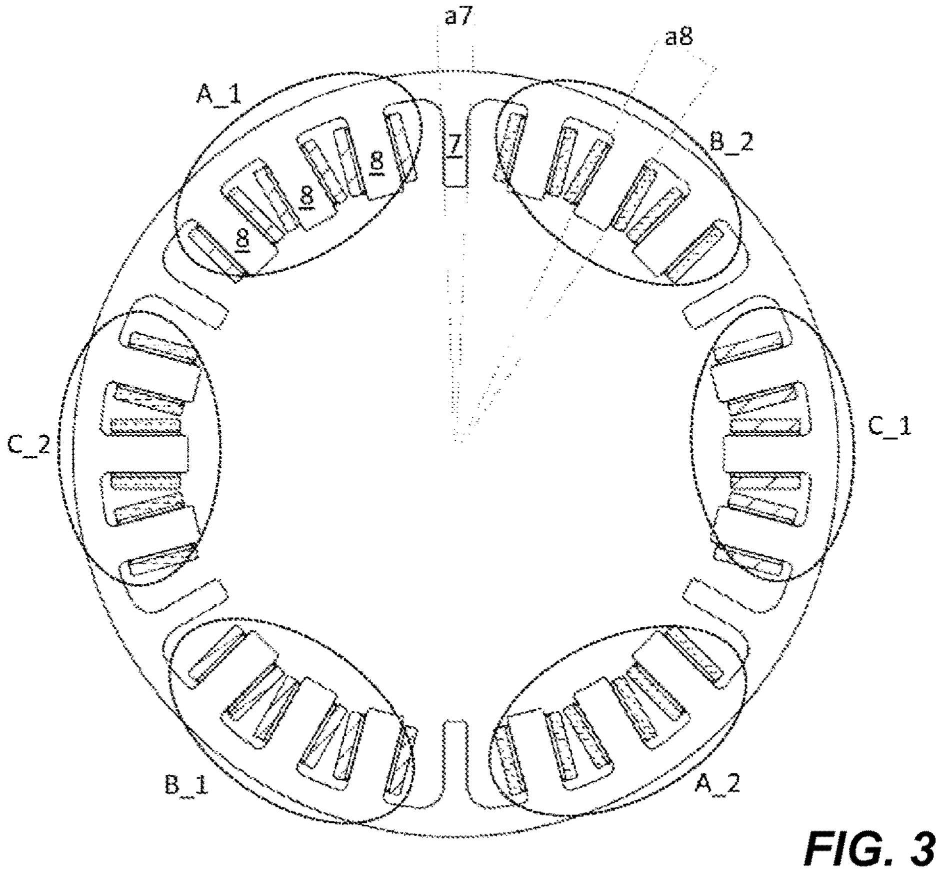
FIG. 3 is a schematic cross-sectional view of a machine according to the present disclosure in a third embodiment.

FIG. 3 shows an alternative machine embodiment, without visible rotor, where each half-machine (1, 2) is composed of three elementary patterns extending over a mechanical angle of 60° and made of a set here comprising 3 consecutive main teeth (8) and a decoupling tooth (7), each of the three main teeth bearing a set of coils belonging to the same phase of the same half-machine. In FIG. 3, the indices A, B and C refer to the three different phases of each half-machine (indices _1 and _2) separated from each other by a decoupling tooth (7) bearing no winding. The two half-machines (1) and (2) are nested here, because a phase of the first half-machine (index _1) is followed angularly by a phase of the second half-machine (index _2), the two being separated by a decoupling tooth (7).

Figure 4:
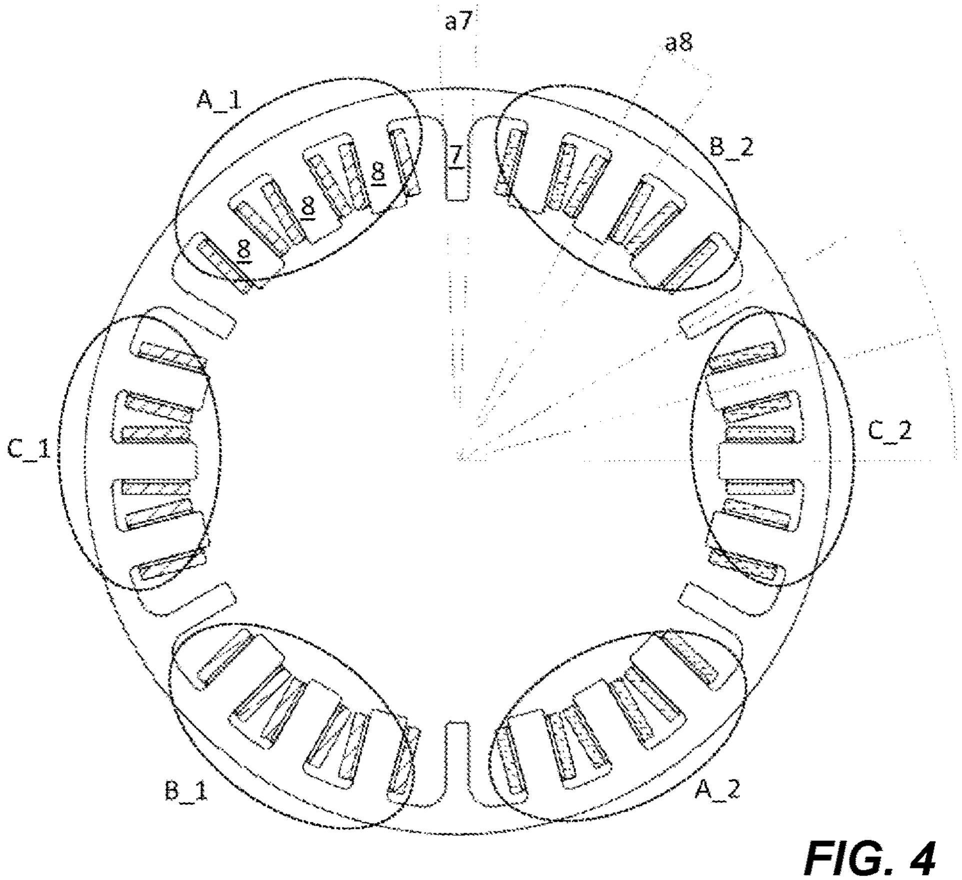
FIG. 4 is a schematic cross-sectional view of a machine according to the present disclosure in a fourth embodiment.

In FIG. 4, a variant embodiment similar to that of FIG. 3 is shown, but for which the two half-machines (1) and (2) are each spatially positioned over 180°, the first half-machine (index _1) is composed of 3 successive elementary patterns in the tangent direction, just like the second half-machine (index _2). Each phase (A_2, B_2, C_2, A_1, B_1, C_1) is borne by three main teeth (8) and separated by a decoupling tooth (7).

Figure 5:
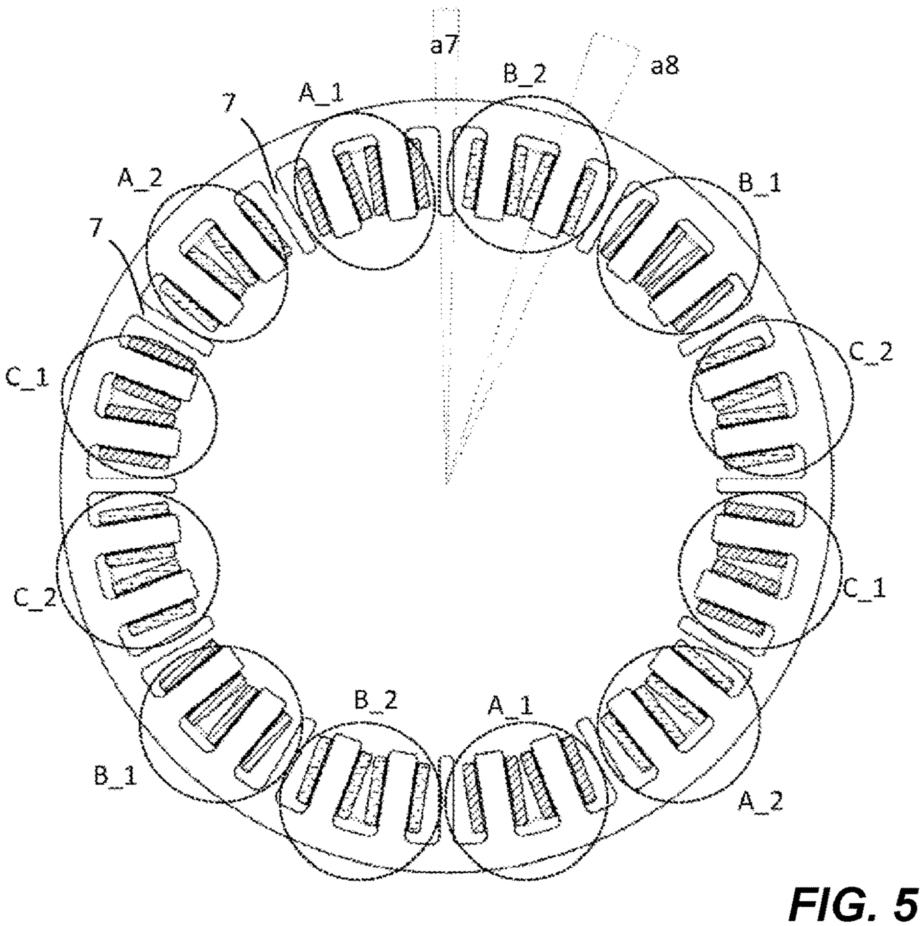
FIG. 5 is a schematic cross-sectional view of a machine according to the present disclosure in a fifth embodiment.

FIG. 5 shows a 36-tooth machine having four coils per phase with two groups of two diametrically opposed teeth. The two half-machines (indexes _1 and _2) are nested, that is to say, alternating two wound teeth of the same phase and of the same machine with two wound teeth of the same phase and the other machine, each group of two teeth being separated from its neighbor by a decoupling tooth (7).

Figure 6:
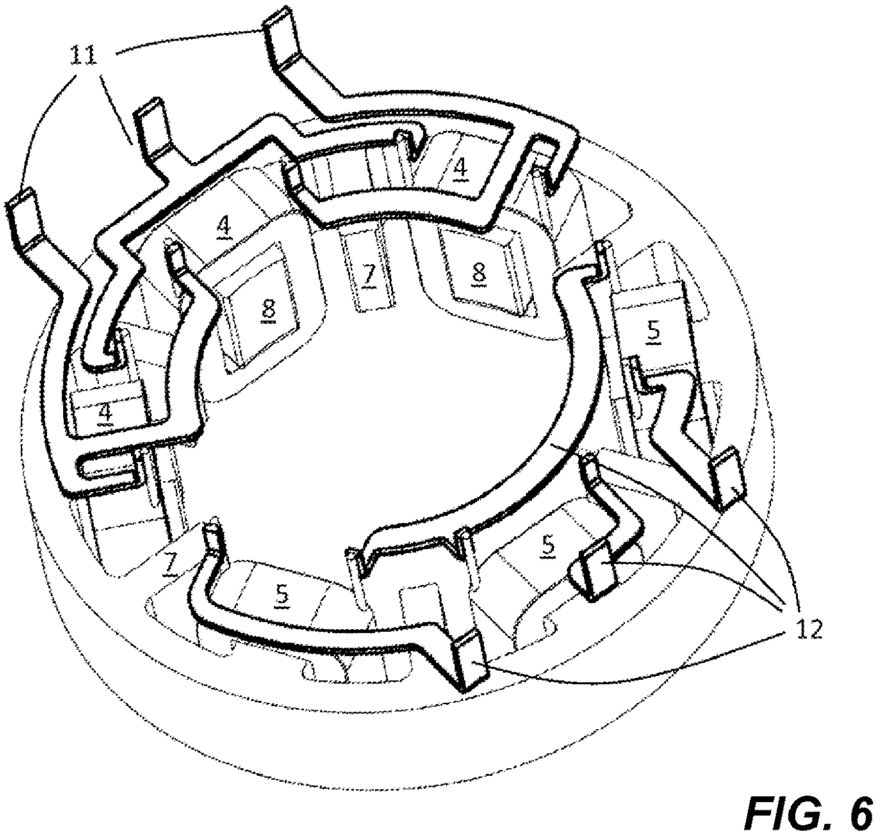
FIG. 6 is a perspective view of a machine according to the present disclosure with a first example of electrical connection of the phases.

FIG. 6 shows, by way of non-limiting example, the connectors of a machine having 6 main teeth (8) and 6 decoupling teeth (7). The stator (3) is made of two half-machines (1) and (2) each extending over an angle of approximately 180°. This solution thus makes it possible to ensure the connection of the windings owing to the distribution of the currents between the two half-machines, two sets and of conductive parts (11, 12), typically made from copper, ensuring the electrical connection of the winding of the first half-machine (1) in a star configuration and the connection of the winding of the second half-machine (2) in a delta configuration. The sets of conductive parts (11) and (12) can advantageously be arranged on the same plane in order to improve the compactness of the assembly and to reduce the risks of electrical contact between the various electrical parts without using specific insulation.

Figure 7:
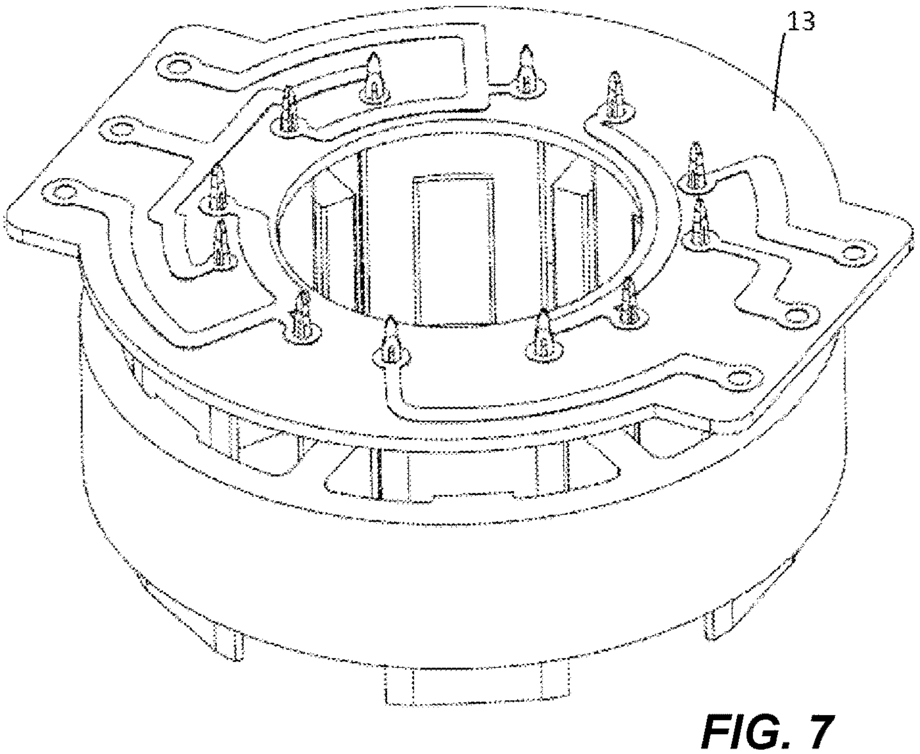
FIG. 7 is a perspective view of a machine according to the present disclosure with a second example of electrical connection of the phases.

FIG. 7 is an alternative for connecting the windings of the two half-machines by directly using a printed circuit (13) connected to the various windings, without using the conductive parts previously described, the tracks of the printed circuit (13) performing the star and delta connection function of the windings. In this solution, each coil is connected directly to the printed circuit (13) by means of a pressfit-type connection.

Figure 8:
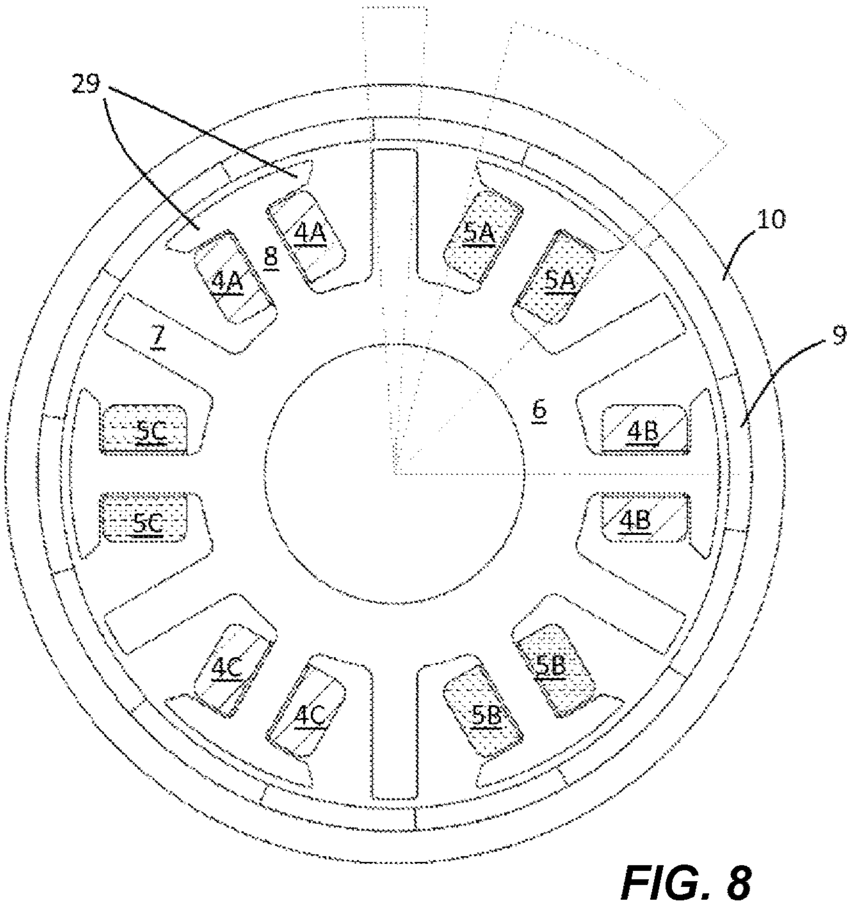
FIG. 8 is a schematic cross-sectional view of a machine according to the present disclosure in another embodiment.

FIG. 8 shows an electric machine according to an alternative embodiment comprising a rotor external to the stator, comprising a yoke (10) bearing a ring of magnets (9), where the half-machines are nested, the coils (4A, 4B and 4C) belonging to a first half-machine and the coils (5A, 5B and 5C) belonging to a second half-machine, and which has the particularity of having pole shoes, that is to say, an enlargement from the free end of the tooth opposite the rotor, on the main teeth (8), the decoupling teeth having a constant width in the radial direction, without spreading out at their free end.

Figure 9A:
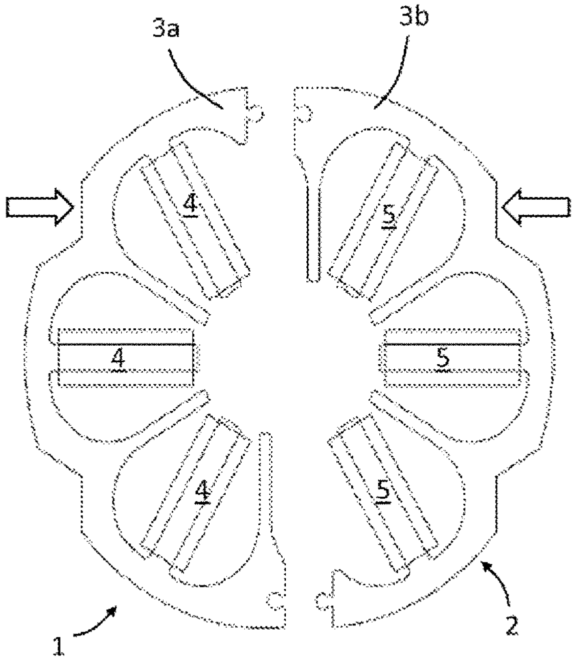
FIGS. 9A and 9B are two schematic cross-sectional views of a machine according to the present disclosure in one particular embodiment.
Figure 9B:
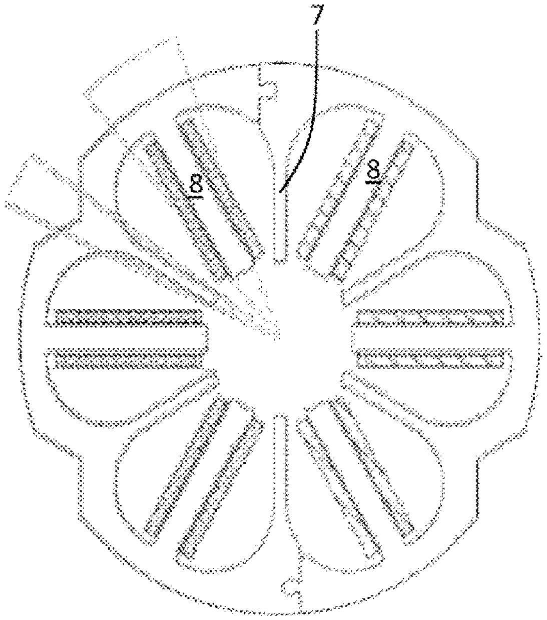

FIGS. 9A and 9B show another embodiment in which the two half-machines (1, 2) are each built on a half-stator (1*a*, 1*b*). FIG. 9A is a view before assembly, and FIG. 9B is a view after assembly. The delimitation of the two half-stators (3a, 3b) can take place at the center of the decoupling teeth (7), or it can also take place on the edge of the decoupling teeth (7) as shown here. This embodiment makes it possible to insert the coils (4, 5) on the main teeth (8), which are longer than in the other embodiments, by mounting the coils (4, 5) of the two half-machines before the assembly of the complete machine. The assembly of the various coils (4, 5) could not have been possible on a single stator, the central opening where the rotor (not shown) must be housed not allowing the passage of these coils.

Figure 10:
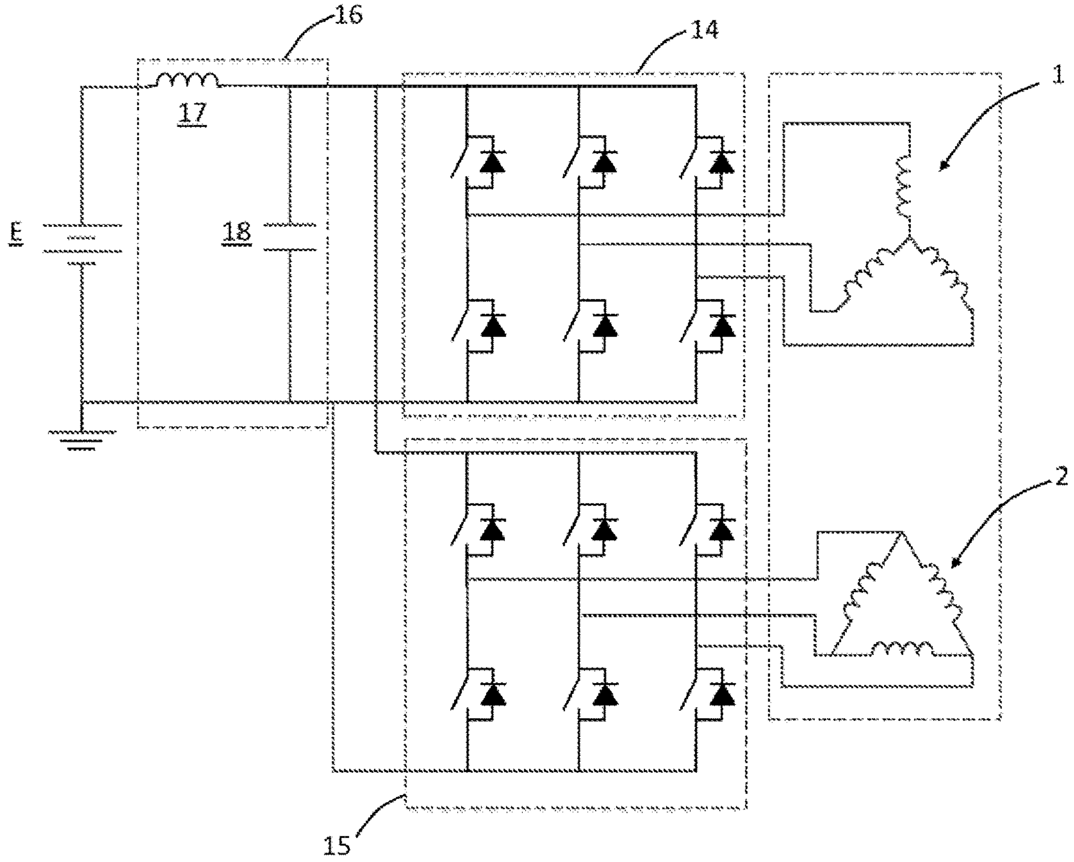
FIG. 10 is a schematic view of the connection of a machine according to the present disclosure to a control converter in a first example embodiment.

FIG. 10 shows a schematic view of the electrical connection of a machine according to the present disclosure to a converter. Each half-machine, connected in a star and delta configuration, is supplied with voltage by a three-phase bridge, respectively (14, 15), each consisting of six electronic switches, according to a configuration conventional for those skilled in the art. The converter has a filter (16) as input, connected to the voltage source (E) made by a set of inductors (17) and a capacitor bank (18). This filter (16) is connected to the terminals of the three-phase bridges (14, 15) connected to the two half-machines (1, 2). The adapted and alternated control of the various switches allows the size of the filter (16) to be minimized, reducing cost and overall size.

Figure 11:
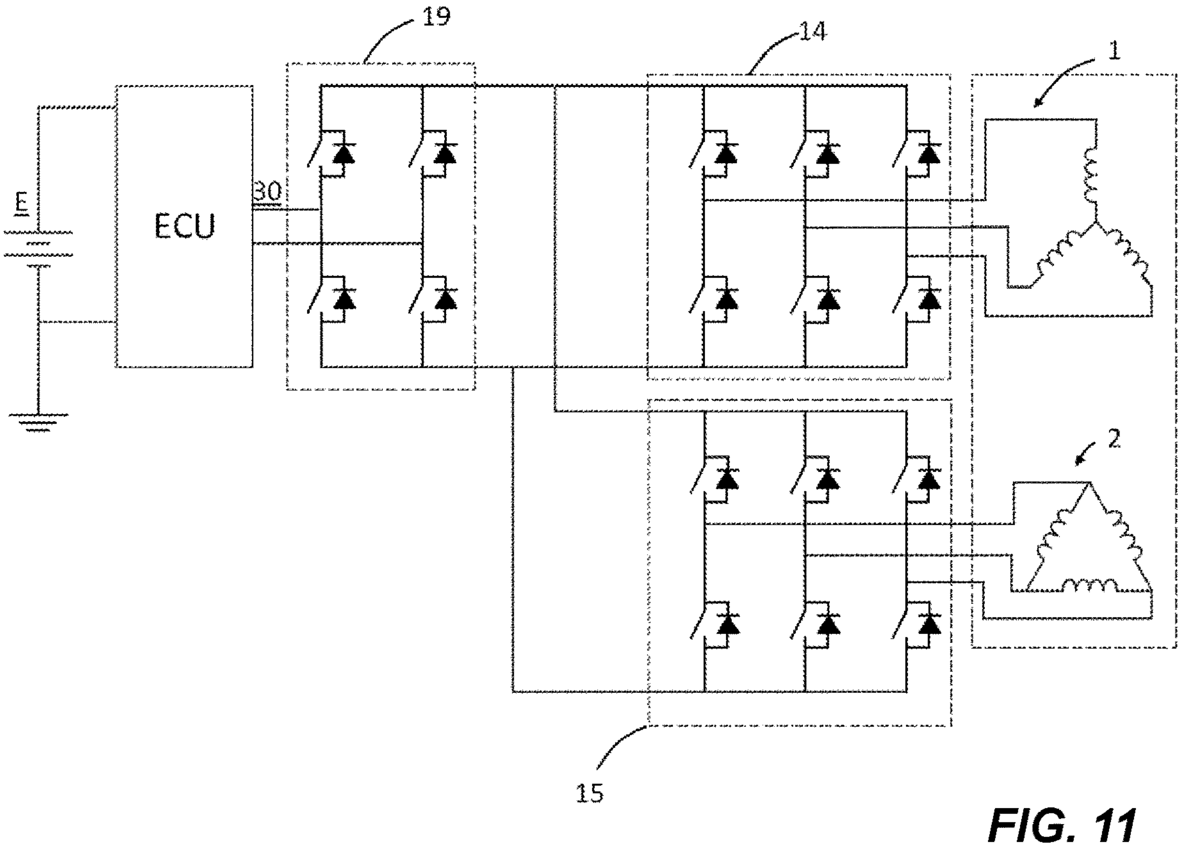
FIG. 11 is a schematic view of the connection of a machine according to the present disclosure to a control converter in a second example embodiment.

FIG. 11 shows a schematic view of the electrical connection of a machine according to the present disclosure to a converter allowing the control of the six-phase machine via a two-wire signal (30), such as that supplied by the electronic control unit (ECU) of a vehicle powered by a voltage source such as a battery (E), for example, via pulse width modulation, known as PWM. Because the two-wire signal (30) can have a negative or positive polarity, that is to say, an electrical ground that can be on the upper or lower line, the converter comprises a rectifier (19), here active, controlled by four electronic switches, making it possible to pass from a positive or negative pulse signal to positive pulses that supply the three-phase bridges (14, 15).

Figure 12:
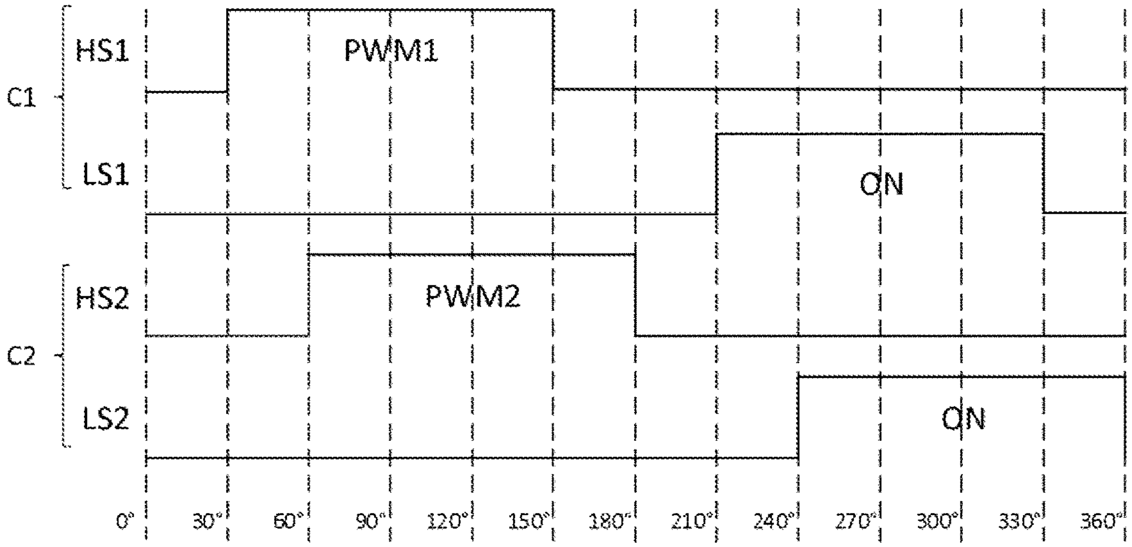
FIG. 12 is a block control timing diagram using pulse width modulation that can be used to control a machine according to the present disclosure.
Figure 13:
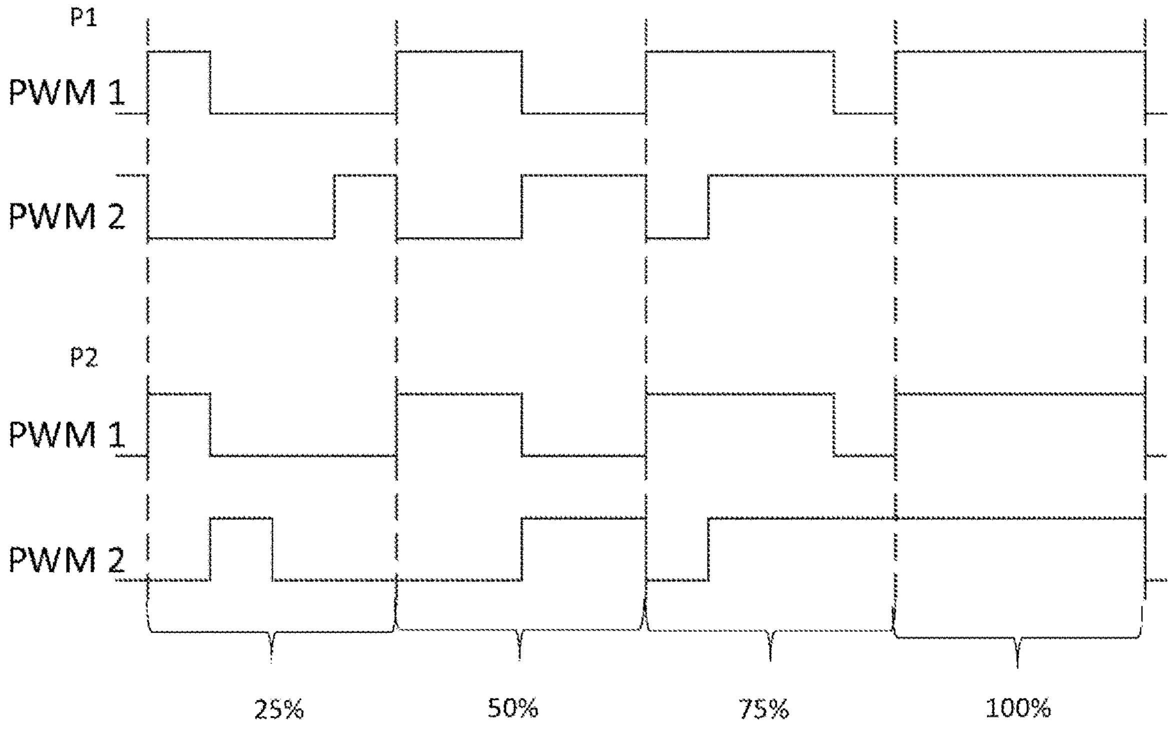
FIG. 13 illustrates two detailed pulse width modulation timing diagrams for different duty cycles and two different methods that can be applied to a machine according to the present disclosure.

FIG. 12 shows the principle of the control applied to the phases of the two half-machines. The commands C1 and C2 are applied to the branches of the three-phase bridges of FIG. 10; for example, the command C2 has an electrical offset of 30° with respect to the command C1, this angular offset coming from the electrical offset between the induced voltages of the phases of the second half-machine compared to those of the first. Each command C1 and C2 is composed of a control (HS1, HS2) of the voltage-side transistors, called "high side," receiving a PWM-type chopped voltage (PWM1, PWM2) and a control (LS1, LS2) of the ground-side transistors, called "low side," receiving a constant voltage (ON). Each control presented here is traditionally used as a block for three-phase machines and is also referred to as "slow decay." FIG. 13 describes two methods for controlling the half-machines, denoted P1 and P2, respectively, by means of pulse-width modulation commands PWM1 and PWM2 that are applied to the three-phase bridges of each half-machine. The purpose of the two methods P1 and P2 is to minimize the recovery times during which the two half-machines are supplied at the same time, in order to reduce the current ripple and thus to minimize the size of the filter described above for the converter driving the machine. By alternating the power supply between the two half-machines as much as possible, this goal can be achieved according to the duty cycle indicated as a percentage in the figure. The method will be all the more effective when the duty cycle is low. As shown in FIG. 13, whether for method P1 or P2, no overlap between PWM1 and PWM2 is observed when the duty cycle is less than 50%.

For example, case P1, the method involves carrying out a control symmetry with respect to the middle of the period. For example, case P2, the method involves triggering the command PWM2 after the end of the positive command PWM1 when the duty cycle is less than 50%, then in minimizing the overlap of the signals above this value.

Figure 14:
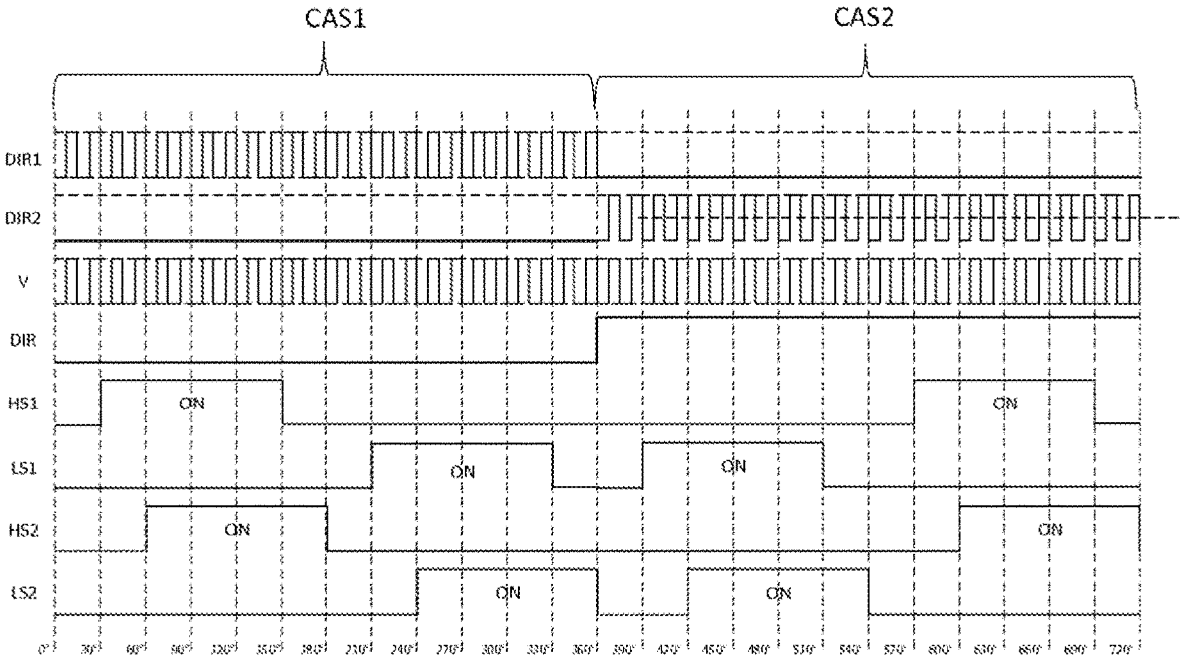
FIG. 14 is a block control timing diagram using pulse width modulation that can be used to control a machine according to the present disclosure.

FIG. 14 shows typical signals applied to a converter as shown in FIG. 12. DIR1 and DIR2 represent the two-wire signal (30). In the case CAS1 on the left side of the figure, PWM control is generated on the DIR1 line, so that a positive average voltage value is obtained on this line, while the DIR2 line is at a zero value, corresponding to the electrical ground. On the right for case CAS2, DIR2 presents a positive average value and DIR1 is at a zero value. After rectification by the element (19), the signal entering the power bridges (14, 15) is as presented in line V, but the control (HS1, LSI, HS2, LS2) of the switches of the power bridges (14, 15) will be performed depending on the polarity of DIR1 and DIR2, and will be different in both cases CAS1 and CAS2.

Figure 15:
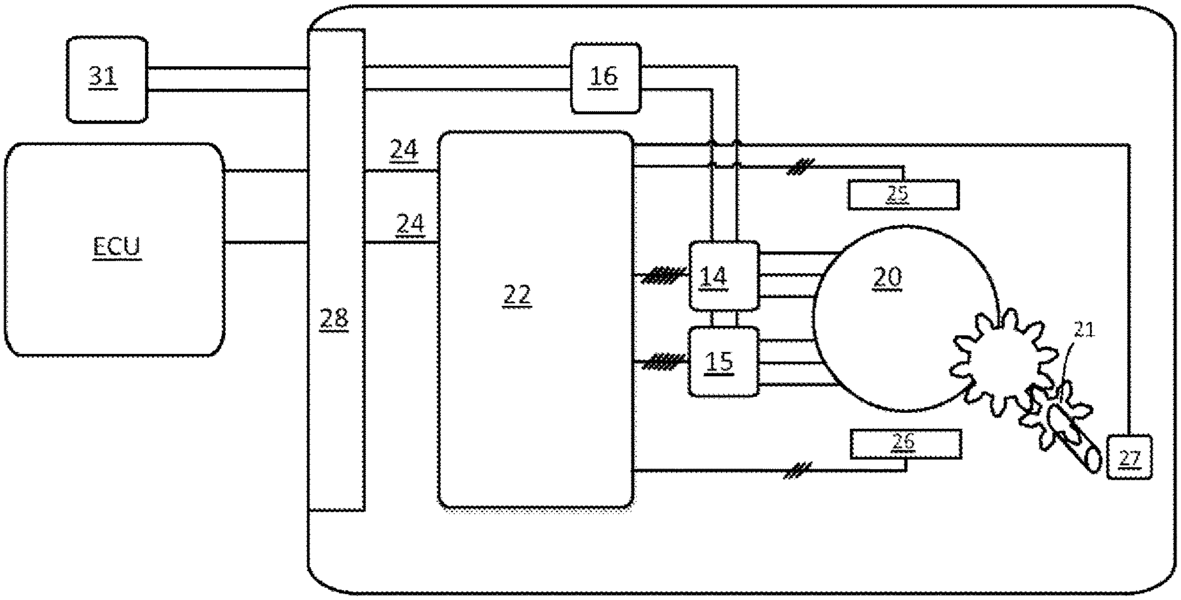
FIG. 15 illustrates a first example of a mechatronic assembly implementing a machine according to the present disclosure.

FIG. 15 shows a mechatronic assembly allowing creation of a movement by using the energy of a battery (31) for a vehicle delivering a constant voltage, connected to two three-phase bridges (14, 15), after filtering (16), making it possible to generate alternating voltages at the terminals of the six-phase machine (20) connected directly to a mechanical load (21). The three-phase bridges (14, 15) are controlled by a microcontroller (22) connected to a centralized computing unit (ECU). The microcontroller (22) exchanges information via a two-way link (24) with the central processing unit (ECU) and receives information from position sensors (25, 26) making it possible to know the engine position and from an absolute position sensor (27) at the load output. The connection to the rectifier (19) is made via a connector (28) allowing the transfer of orders from the computing unit (ECU) and the power lines coming from the battery (31).

Figure 16:
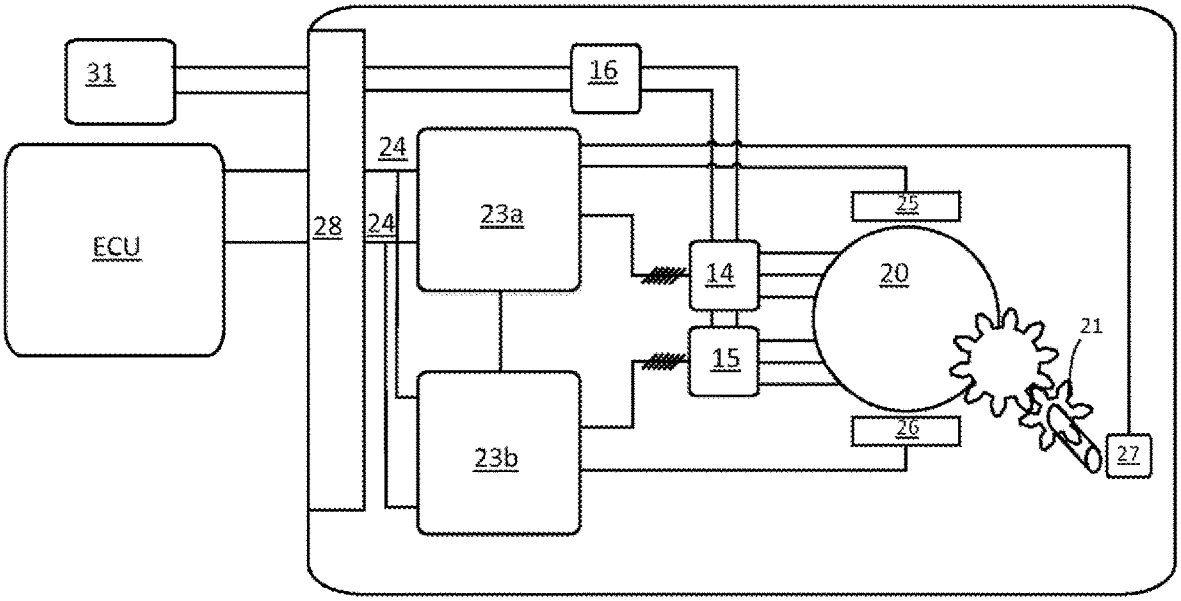
FIG. 16 illustrates a second example of a mechatronic assembly implementing a machine according to the present disclosure.

FIG. 16 shows an alternative embodiment of a mechatronic assembly similar to FIG. 15 but using two controllers (23a, 23b) instead of just one, each of these controllers (23a, 23b) driving the respective three-phase bridges (14, 15) from the position information coming from the position sensors (25, 26) of the rotor of the machine (20).

Figure 17:
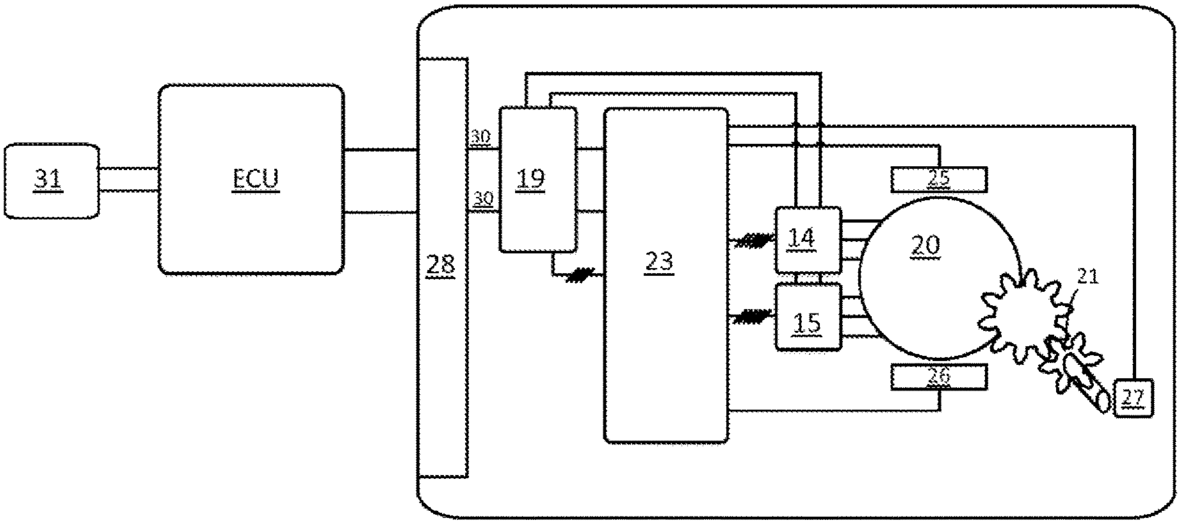
FIG. 17 illustrates a third example of a mechatronic assembly implementing a machine according to the present disclosure.

FIG. 17 shows a particular embodiment of a mechatronic assembly using a machine according to the present disclosure, implementing the converter shown in FIG. 11. In this assembly, a battery (31) powers an electronic control unit (ECU) that supplies, through a connector (28), a two-wire signal (30), preferably in the form of a PWM signal, which passes through a rectifier (19) before supplying the three-phase bridges (14, 15) and the microcontroller (23) in order to drive and control the six-phase machine.

Application: Electric Phase Shifter

An electric machine according to the present disclosure is particularly suitable for driving a camshaft phase shifter.

Figure 18:
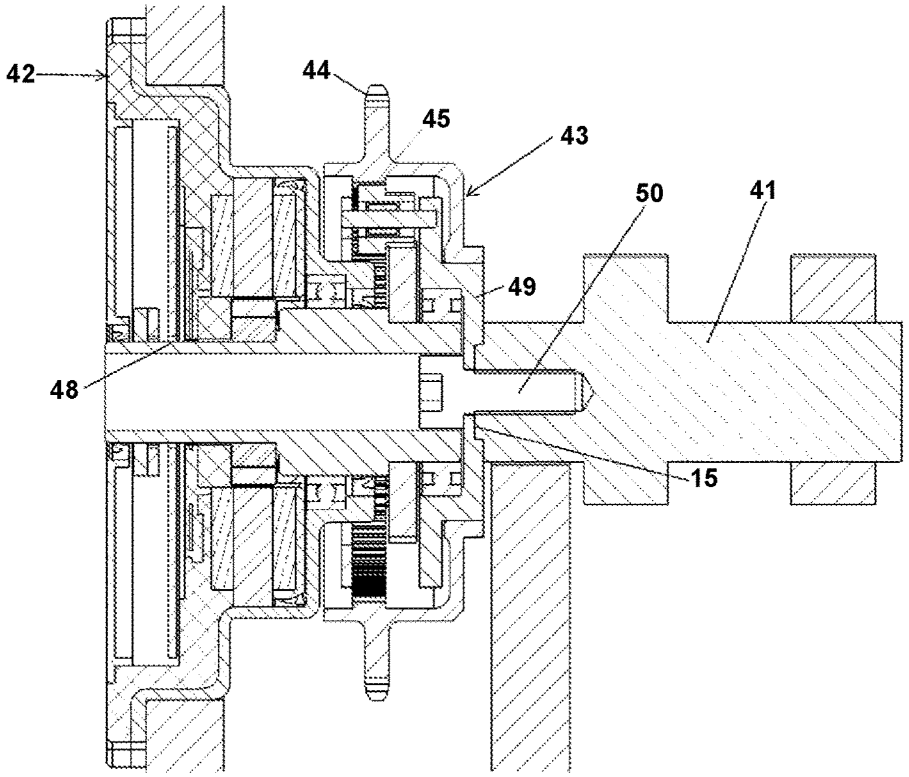
FIG. 18 is a sectional view of a device according to one embodiment.

FIG. 18 shows a sectional view of a device according to one embodiment, coupled to a camshaft (41). The device comprises an electric machine (42) as described above, associated with a reduction gear (43), here of the trochoidal type.

The reduction gear (43) comprises an outer ring gear (44) driven by the chain or timing belt of the internal combustion engine (not shown). This outer ring gear (44) has a typical outer diameter of 100 to 150 millimeters and has outer teeth suitable for being driven by the timing chain. On its inner surface, it has a toothed track (45), of tubular shape. This outer ring gear (44) is free to rotate relative to the camshaft (41).

An eccentric toothed wheel has a section smaller than the inner section of the outer ring gear (44), the number of teeth of the toothed wheel being less than the number of teeth of the toothed track (45) on the inner surface of the outer ring gear (44), with identical modulus.

The difference between the number of teeth of the eccentric toothed wheel and the number of teeth of the toothed track on the inner surface of the outer ring gear is advantageously one tooth in order to maximize the reduction ratio of the trochoidal reduction gear (43).

The eccentric toothed wheel is guided by a bearing mounted on the single shaft (48) at an eccentric whose axis of revolution is offset with respect to the central axis of the single shaft (48). The offset between these two axes is generally between 0.1 and 1 mm and depends on the modulus of the toothing of the trochoidal mesh.

This output disc (49) is also secured to the camshaft (41) by a screw (50) with which it is coupled via a radial expansion, close to the axis of rotation of the formed assembly.

The present disclosure is not limited to the trochoidal-type reduction gear. Indeed, other reduction gears can be used, for example, an epicyclic-type reduction gear. The choice of one reduction gear or another can be dictated according to the desired reduction ratio and according to the final cost of the solution.

Different details of the production of such a camshaft phase shifter are described in European patent EP3464841, which does not constitute a limitation of the protection but a simple example of a mechanism capable of being driven by an electric machine according to the present disclosure.

Application: Wastegate Actuator for Turbocharger

An electric machine according to the present disclosure is particularly suitable for controlling a discharge valve for the turbocharger of internal combustion engines, commonly called "wastegate." This wastegate thus regulates the gas pressure in the turbocharger turbine.

Heat engines (for motor vehicles, trucks, construction machinery, etc.) operate by the explosion of an air/fuel mixture in the combustion chamber of the cylinders.

The engine air loop, whose function is to route, manage and discharge the air supplying the engine, operates using various valves. To improve the performance of the internal combustion engine, some vehicles are fitted with a turbocharger whose role is to charge the combustion chamber with air.

An electric machine according to the present disclosure represents a particularly well-suited solution for these demanding applications such as turbochargers.

Application: Electronic Phase Balancing Method

An electric machine according to the present disclosure has an intrinsic sensitivity to unbalances in the impedance or inductance of its phases. These unbalances are common, but often negligible in the usual machines and can come from manufacturing dispersions on the number of turns constituting the coils, from the variable quality of the electrical connections by press-fit or by welding, from an imbalance of the lengths of the electrical connections, etc. In the particular case of an electric machine according to the present disclosure, the difference in topology of the two half-machines, one being connected in a star configuration and the other in a delta configuration, necessarily involves using a different number of turns between the coils of these two half-machines to obtain an equivalent current at an identical inverter voltage. This difference corresponds to an ideal ratio and the effective number of turns of each of the two half-machines is obtained by rounding to the nearest integer. This implies that an error, equivalent to the impedance of a half-turn or more, can be committed, and this error is even more significant as the number of turns constituting the windings becomes low; one thus obtains a current imbalance between the phases of the two half-machines of up to 10%. This imbalance causes a torque ripple that complicates the control, premature wear of the guidance system, as well as premature wear of the electronic components due to greater stress on one of the two half-machines with respect to the other.

An economical characterization and compensation method is proposed in FIGS. 19A, 19B, 20A and 20B. This method requires adding at least one current measuring element (100) on one of the DC lines between the inverters and the filter, visible in FIGS. 19A and 19B. The use of at least one current measurement element (100), positioned between the inverters and the filter and coupled to an algorithm allowing discrimination of the compositions of each inverter/motor assembly, allows an optimization of the electrical architecture. It should be noted that it is possible to use multiple current measurement elements (100), for example, one per inverter, so as to improve the precision of this measurement.

Figure 19A:
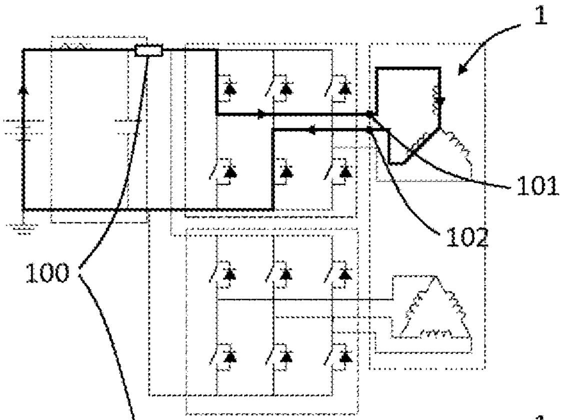
FIGS. 19A and 19B are schematic views of the connection of a machine according to the present disclosure to a control converter representing the two switching states used to characterize a phase of the first three-phase winding.
Figure 19B:
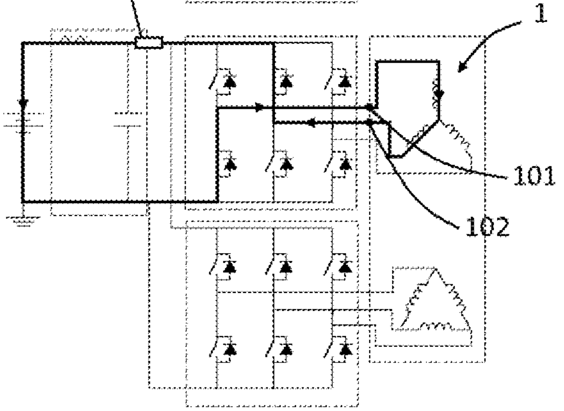
Figure 20A:
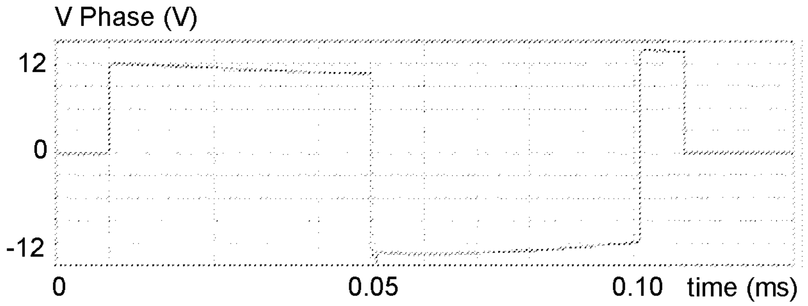
FIG. 20A illustrates a measurement of the voltage at the terminals of two terminations of a three-phase inverter and FIG. 20B illustrates measurement of current flowing in a current measurement element, during one of the characterization sequences of the coils.
Figure 20B:
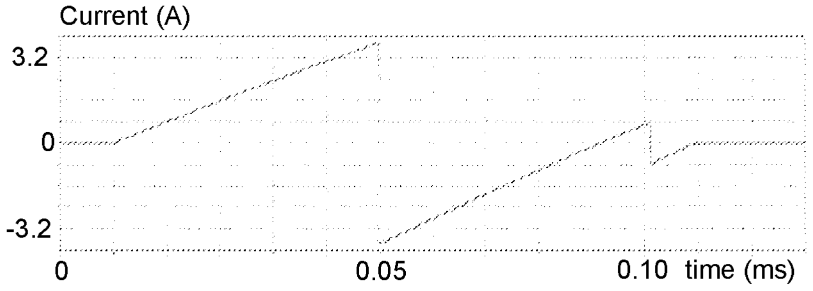

Thus, a characterization, at the output of the production line, of the impedances and inductances of each phase of the motor can be carried out using the application of a simple control sequence and the analysis of the current. This sequence comprises applying the battery voltage to the terminals of a phase for a sufficiently long time to analyze the transient current regimes due to inductive effects, as shown in FIG. 19A for a phase of the half-machine (1) wound in a star configuration, then applying the opposite voltage to this same phase, as shown in FIG. 19B, for a time long enough to observe the new current variation. The voltage, measured at the terminals of the terminations (101, 102) of the powered phase, typically has the shape given in FIG. 20A and the current, measured using the current measurement element (100), is given in FIG. 20B. The measurements of the time constant and of the amplitude of the current make it possible to deduce the values of the inductance and of the impedance of the phase. By repeating this measurement for all the phases of the two half-machines, it is possible to calculate a ratio for each phase, relative to the phase with the worst characteristics. This ratio is then used so as to individually weight the duty cycle of the pulse width modulation managing the voltage wave supplying the half-machines.

Application: Electronic Method for Torque Control Optimization

An electric machine according to the present disclosure has constant resolution torque regulation over its entire functional range. This is owing to the modification of the duty cycle of a pulse width modulation allowing voltage control of the phases. This truth also applies to traditional electric machines, for example, three-phase electric machines. However, it is often necessary in the synchronization applications of two rotary systems, non-limitingly composed of two electrical sub-assemblies, to have a very good resolution to regulate small load variations and therefore a precise torque response of the electric machine. Such a resolution is not necessary when the load variations are significant and a greater torque response of the electric machine is required.

Figure 21A:
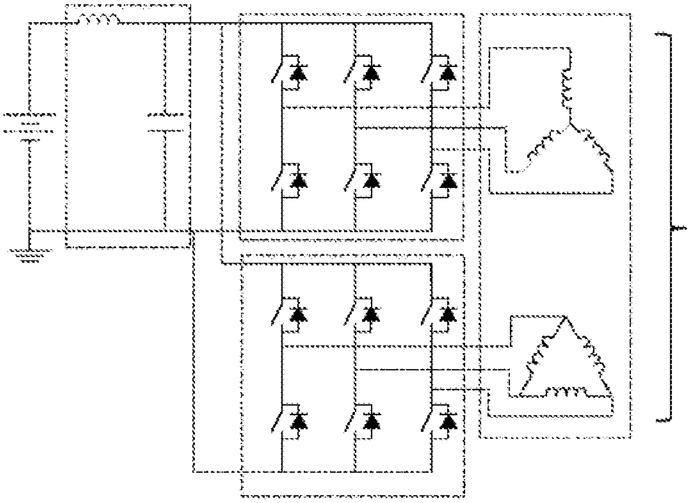
FIGS. 21A and 21B are schematic views of the connection of a machine according to the present disclosure to a control converter representing high torque control and its low torque adaptation with the deactivation of one of the two three-phase windings.

The specificity of the present disclosure allows improvement of the resolution of the torque regulation on the operating range where the torque is the lowest, up to half of the nominal torque of the assembly, as described in FIG. 21A. In this figure, $T_n$ is the torque in normal operation, $\gamma$ is the torque constant, n is the number of turns of each coil, $V_{DC}$ is the inverter supply voltage, D is the duty cycle of the transistors making up the inverter, and $R\psi p_{eq}$ and $L\psi p_{eq}$ are the resistance and the equivalent inductance of a coil for the two half-machines, connected in star and delta configurations, with different duty cycles. It is possible to determine the smallest possible variation of the torque in normal operation, depending on the minimum variation of the duty cycle of the voltage control ΔD, according to $$\Delta T_n = \gamma \cdot n \cdot 2 \frac{V_{DC} \cdot \Delta D}{R\varphi_{eq} + L\varphi_{eq}}.$$

Figure 21B:
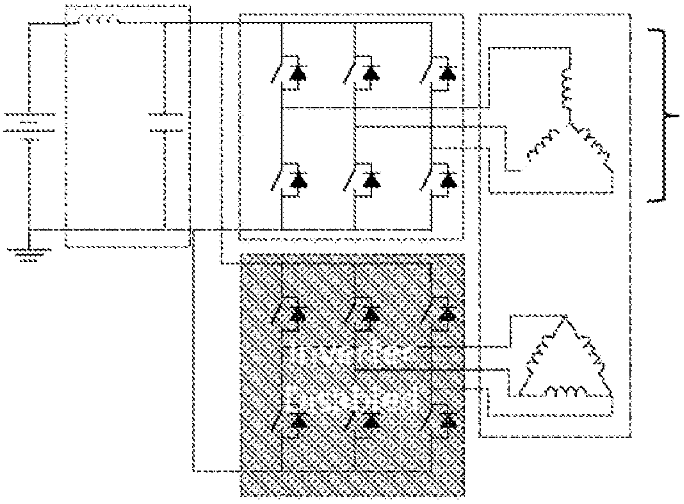

An algorithmic method is therefore proposed in order to deactivate one of the two half-machines when the required torque regulation is below half the nominal torque, as shown in FIG. 21B, where $T_m$ is the accessible torque in this optimized mode. This makes it possible to dedicate all the steps of the pulse width modulation to only the active half-machine instead of sharing them between both half-machines. This therefore amounts to doubling the modulation frequency for the active half-machine and makes it possible to halve the minimum variation of the duty cycle, ΔD, leading to halving the torque resolution of the assembly, $$\Delta T_m = \gamma \cdot n \cdot 2 \frac{V_{DC} \cdot \Delta D}{R\varphi_{eq} + L\varphi_{eq}}.$$

Doubling the modulation frequency of the active machine by deactivating the second one is not the only possible option; it is also envisaged to voluntarily degrade it over certain torque ranges so as to ensure a better transition between the low torque range, where only one machine is active, and the high torque range, where both machines are active. It is also envisaged not to transfer all the control steps of the inactive machine, but only part of them, so as to obtain a progressively variable resolution.

The invention claimed is:

1. An electric machine having a first and a second three-phase winding and comprising a stator formed of a cylindrical yoke made of a soft ferromagnetic material extended radially by a set of teeth, a portion of the set of teeth bearing the windings, the windings being distinct from one another, the first three-phase winding being electrically connected in a delta configuration, the second three-phase winding being electrically connected in a star configuration, wherein the total number of the stator teeth is equal to 3(N1+N2)(k+1) with k being a natural integer greater than or equal to 1 and representing the number of consecutive coils of the same phase of a winding, N1 and N2 being the number of groups of consecutive coils of the same phase of the first and second windings, respectively, the two windings being separated by at least one tooth bearing no winding.

2. The electric machine according to claim 1, wherein the windings are borne by main teeth and the angular width of the at least one decoupling tooth, considered from the center of the machine and delimited by the width of a free end of the teeth, is less than or equal to the angular width of the main teeth.

3. The electric machine according to claim 2, wherein the first three-phase winding is borne by a first group of consecutive stator teeth alternating between a wound tooth and an unwound tooth and wherein the second three-phase winding is borne by a second group of consecutive stator teeth alternating between a wound tooth and an unwound tooth, the first and second groups of stator teeth being separate from each other.

4. The electric machine according to claim 2, wherein the first three-phase winding and the second three-phase winding are alternated so that a periodic pattern is formed of a first tooth of the stator bearing a coil of the first winding, a second decoupling tooth of the stator bearing no winding, and a third tooth of the stator bearing a coil of the second winding, the first, second and third teeth being consecutive in a circumferential direction of the stator.

5. The electric machine according to claim 1, wherein N1=N2=k=1, and wherein the stator has twelve teeth in total including six wound teeth and six non-wound teeth alternately.

6. The electric machine according to claim 1, wherein the first three-phase winding is borne by a first group of consecutive stator teeth alternating between a wound tooth and an unwound tooth and wherein the second three-phase winding is borne by a second group of consecutive stator teeth alternating between a wound tooth and an unwound tooth, the first and second groups of stator teeth being separate from each other.

7. The electric machine according to claim 6, wherein the first winding is angularly distributed over a first sector of 180°, the second winding is angularly distributed over a second sector of 180°, the first and second sectors are separate from each other, and each of the windings is electrically connected to a set of electric tracks, the sets of electric tracks being separate from each other and angularly distributed over two angular sectors of 180° that are separate from each other.

8. The electric machine according to claim 1, wherein the first three-phase winding and the second three-phase winding are alternated so that a periodic pattern is formed of a first tooth of the stator bearing a coil of the first winding, a second decoupling tooth of the stator bearing no winding, and a third tooth of the stator bearing a coil of the second winding, the first, second and third teeth being consecutive in a circumferential direction of the stator.

9. A method for controlling a machine having a three-phase dual winding according to claim 7, the method comprising powering the first and second windings by two different power bridges each comprising six electronic switch cells.

10. The method according to claim 9, further comprising controlling the machine using block control carried out with pulse width modulation (PWM), wherein a first PWM is applied to the first winding, a second PWM is applied to the second winding, and wherein the first and second PWMs are applied so as to minimize or cancel overlap periods during which positive alternations are applied at the same time.

11. The method according to claim 10, wherein the PWMs are applied to the electronic switch cells.

12. The method according to claim 9, wherein PWMs are applied to the electronic switch cells, and wherein the machine further comprises, upstream of the power bridges with six electronic switch cells, a rectifier bridge formed by four electronic switch cells receiving as input a two-wire electrical signal coming from a central control unit, a block control being carried out using a pulse width modulation, called PWM, the PWM control being applied as input of the bridge rectifier, the bridge rectifier carrying out active rectification of the PWM control and the two power bridges being controlled with full pitch.

13. The method according to claim 9, wherein the control of the two three-phase dual windings is carried out by a single and same microprocessor.

14. The method according to claim 9, wherein the control of the two three-phase dual windings is carried out by two separate microprocessors.

15. A method for controlling a machine having a three-phase dual winding according to claim 1, the method comprising controlling each three-phase winding by a block sequence and controlling each three-phase winding with an offset of 30° electric relative to each other.

16. The method according to claim 15, wherein the control of the two three-phase dual windings is carried out by a single and same microprocessor.

17. The method according to claim 15, wherein the control of the two three-phase dual windings is carried out by two separate microprocessors.

* * * * *